Nov. 14, 1939.  M. F. BATES  2,180,136
TEMPERATURE COMPENSATED GYROSCOPE
Filed Dec. 17, 1937
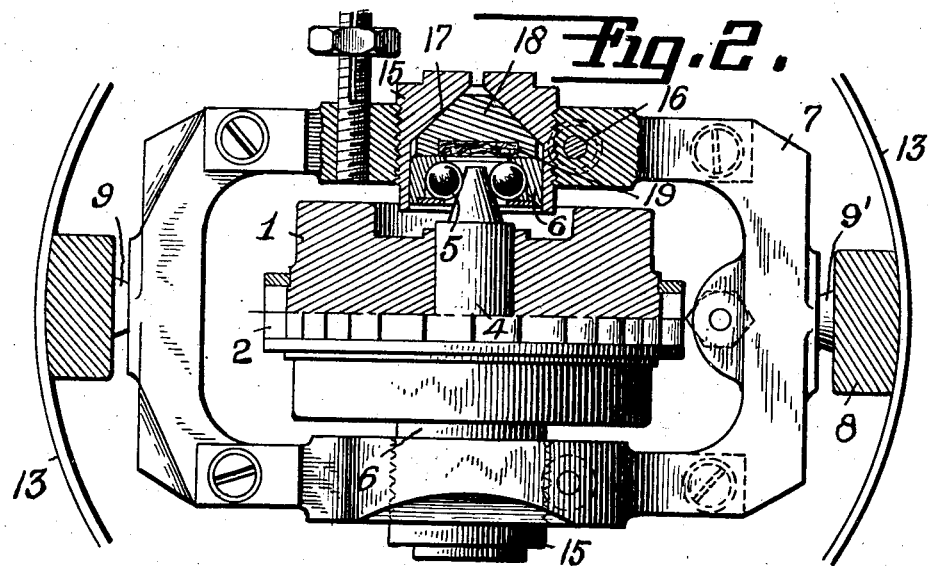
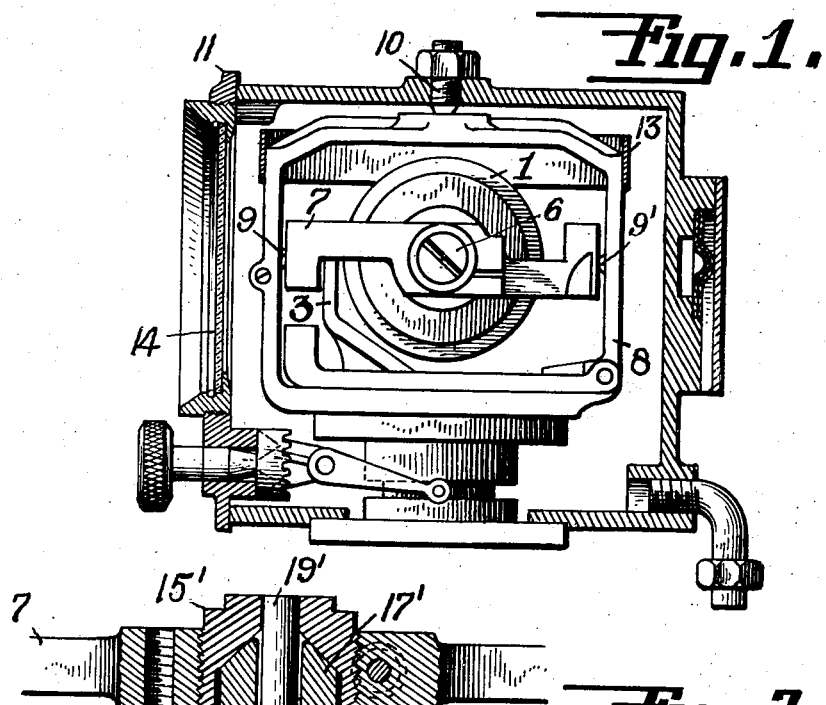
INVENTOR
MORTIMER F. BATES
BY
Herbert H. Thompson
HIS ATTORNEY.

Patented Nov. 14, 1939

2,180,136

UNITED STATES PATENT OFFICE 2,180,136

TEMPERATURE COMPENSATED GYROSCOPE

Mortimer F. Bates, Brooklyn, N. Y., assignor to Sperry Gyroscope Company, Inc., Brooklyn, N. Y., a corporation of New York Application December 17, 1937, Serial No. 180,278

4 Claims. (Cl. 308—178)

This invention relates to gyroscopic instruments especially adapted for use as indicators or base lines on aircraft, such as the artificial horizon and directional gyroscope, in which great precision is necessary. Such instruments are usually air driven and are made as small and light as possible to save weight. Aircraft instruments, however, are subject to great variations in operating temperatures, owing to the extreme cold experienced at the high altitudes at which many aircraft fly today, so that some form of temperature compensation is required.

Temperature compensation has been particularly necessary in the gyroscopic class of instrument because of the "freezing" or tightening up of the rotor bearings, which so slows up the speed of the rotor that it ceases to function. This trouble is caused by the unequal contraction of the rotor, including its shaft, as compared to the rotor bearing ring or casing due to the fact that the rotor shaft is usually made of hardened steel for its wearing qualities and the rotor ring or casing of aluminum alloy for lightness. Since the coefficient of expansion of the latter is much greater than that of steel, it was found that bearings operating satisfactorily under normal temperature conditions would bind at low temperatures. Even where the rotor is made without a shaft, the same difficulty arises due to the fact that the rotor is usually made of heavy metal, such as brass, which has a lower temperature coefficient of expansion than the aluminum alloy rotor bearing ring.

More particularly, this invention constitutes an improvement in my prior Patent No. 2,047,186, dated July 14, 1936, in that fewer parts are used and a standard ball race may be employed for the bearing instead of the special ball race disclosed in my prior patent.

Referring to the drawing, showing several forms my invention may assume,

Fig. 1 is a vertical section through the rotor bearing casing of a directional gyroscope, showing the gyroscope in side elevation.

Fig. 2 is a plan view, partly in section, of the gyro rotor and rotor bearing ring constructed in accordance with my invention, and on a larger scale than Fig. 1.

Fig. 3 is a detailed sectional view of a modified form of bearings in which the bearings are inverted as compared to Fig. 2.

The particular gyroscope selected for illustration is a directional gyroscope in which the rotor I may be air driven by means of buckets 2 on the periphery thereof, against which air from an air jet in tube 3 strikes. The rotor is usually made of a heavy metal, such as brass, the rotor shaft 4 being of hardened steel to provide a long life bearing. The shaft is shown as tapered at its ends to engage the balls 5 of anti-friction bearings 6 in the rotor bearing ring 7, thus providing a combined radial and thrust bearing sometimes termed a cup bearing.

The rotor bearing ring, in turn, is mounted for oscillation about a horizontal axis in the vertical ring 8 through bearings 9 and 9', the vertical ring in turn being mounted for turning about a vertical axis 10 in the outer casing 11. The compass card 13 is shown as secured to the vertical ring, the same being visible through the front window 14 in casing 11.

For the sake of saving weight, the rotor bearing ring is preferably made of aluminum alloy. To avoid the ill effects of wide temperature changes on the freedom of the rotor bearings, I have shown a special form of temperature compensated bearing preferably used at both ends of the rotor shaft and which comprises a bearing housing 15 threaded in an aperture in the end of ring 7 and clamped therein by set screw 16. Said housing is preferably made of Invar steel or other metal having a low temperature coefficient of expansion, that is, a low expansion rate with rising temperature and therefore a low contraction rate with falling temperatures.

Within said housing I slidably mount a steel ball bearing race 6 supporting the balls 5 engaging the tapered end in shaft 4, forming a combined radial and thrust bearing. The interior surface of housing 15 is tapered outwardly as shown at 17. Within said taper is loosely fitted a small conical shaped block 18 formed of material having a relatively high coefficient of expansion, such as aluminum alloy. Said block acts as a variable spacer between the bearing and the housing, the base thereof resting against the race 6. Lubricating packing may be inserted at 19. The outer surface of the cone and the inner surface of the housing have substantially the same taper and are highly polished, so that as the cone expands with respect to the housing, it pushes its base and hence race 6 inwardly, and as it contracts with respect to the housing with increasing cold, it increases the clearance so as to compensate for the relative contraction of the bearing ring 7 that takes place under these conditions. With this form of bearing, the standard ball bearing race with cylindrical exterior may be employed, and no springs are necessary. The amount of taper of the wall 17 and cone 18 may be designed so as to cause exactly the correct amount of movement of the base of the cones 18 on each side of the rotor to secure the correct compensation with temperature changes, and at the same time preserve the balance of the gyroscope.

Obviously, this form of bearing may also be employed where no shaft is employed extending through the rotor, the steel studs being secured in the rotor bearing frame and the ball bearings in the rotor. Such a construction is shown in Fig. 3. In this case the housing 15' may be designed as before with due allowance, of course, in the amount of taper therein to compensate for the rate of expansion in the brass rotor 1' as compared with the aluminum rotor bearing ring 7. The conical spacer 17' may likewise be of similar construction. In this case, both the housing and the spacer have axially extending apertures through which extends the stem 19' of the steel stub shaft 20. Said shaft is shown as having a conical inner end engaging the balls of combined radial and thrust ball bearing 21 mounted in the cavity in the rotor 1'. Said shaft is also shown as having a collar 22 against which the base of the member 17' rests. It will readily be apparent, therefore, that as the member 17' contracts, for instance, with respect to the housing 15', greater clearance will be afforded the stub shaft 20, and thereby binding of the bearing prevented as the temperature falls.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In a combined radial and thrust bearing construction for gyroscopic indicators, the combination with a rotor and rotor shaft bearing ring having different coefficients of expansion, of a bearing housing secured in said ring of a low temperature coefficient of expansion and having its hollow interior inwardly tapering as it recedes from said rotor, a conical member of relatively high coefficient of expansion slidably fitted within said portion, and a combined radial and thrust bearing member between said conical member and the rotor, whereby when said housing is pushed inwardly toward the rotor as the temperature falls, a compensating clearance is provided by the shrinkage of said conical member within its housing.

2. In a gyroscopic apparatus for aircraft, the combination with the rotor shaft of a hard metal and a rotor bearing ring of a light metal having a greater coefficient of expansion than said shaft, of a ball bearing between said shaft and ring having a ball race comprising a steel ring within which are confined the balls, a steel housing in said ring within which said race is slidably mounted and which has a tapered interior behind the race, and a cone having a greater coefficient of expansion than said housing within said tapered interior.

3. In a gyroscopic indicator, the combination with a rotor and rotor shaft bearing ring having different coefficients of expansion, of a combined radial and thrust bearing for each side of the rotor including a bearing housing secured in said ring of a low temperature coefficient of expansion and having an outwardly tapered interior portion, a conical member of relatively high coefficient of expansion slidably fitted within said portion, a tapered stud slidably supported within said member having a collar resting against the base of said member, and a ball bearing supported within the rotor cooperating with the tapered end of said stud, whereby when said housing is pushed inwardly toward the rotor as the temperature falls, a compensating clearance is provided by the shrinkage of said conical member within its housing behind the collar of said stud.

4. In a gyroscopic indicator, the combination with a rotor and rotor shaft bearing ring having different coefficients of expansion, of a combined radial and thrust bearing for each side of the rotor including a bearing housing secured in said ring of a low temperature coefficient of expansion such as steel and having an outwardly tapered interior portion, a conical member of relatively high coefficient of expansion such as aluminum alloy slidably fitted within said portion, a two element thrust and radial bearing between the rotor and housing including a ball bearing and a cooperating tapered shaft one of which parts is slidably mounted so as to be moved toward and away from the other part by the action of said conical member to compensate for changes in clearance caused by temperature changes in said rotor and bearing ring.

MORTIMER F. BATES.